United States Patent [19]
Cabriere

[11] 3,940,093
[45] Feb. 24, 1976

[54] FLAP OR WING DROOP ARRANGEMENT FOR AN AIRCRAFT WING

[75] Inventor: Jean Cabriere, Vaucresson, France

[73] Assignee: Avions Marcel Dassault-Breguet Aviation, Paris, France

[22] Filed: May 28, 1974

[21] Appl. No.: 473,710

[30] Foreign Application Priority Data
May 29, 1973 France .................... 73.19462

[52] U.S. Cl. ............ 244/42 A; 244/42 CA; 244/78; 244/82
[51] Int. Cl.² ........................................ B64C 9/24
[58] Field of Search ......... 244/42 R, 42 A, 42 CA, 244/42 CB, 42 D, 42 DA, 42 DB, 42 DC, 43, 44, 76 R, 77 D, 78, 82, 12 R, 85

[56] References Cited
UNITED STATES PATENTS

| 1,818,044 | 8/1931 | Constantin | 244/42 A |
| 1,951,464 | 3/1934 | Wragg | 244/42 A |
| 2,316,235 | 4/1943 | Gast | 244/42 A X |
| 2,342,184 | 2/1944 | Fawcett | 244/42 A X |
| 2,350,751 | 6/1944 | Gliubich | 244/42 A X |
| 2,702,676 | 2/1955 | Delaney | 244/42 CA |
| 2,877,968 | 3/1959 | Granan et al. | 244/78 |
| 2,886,264 | 5/1959 | Seager | 244/12 R |
| 3,237,107 | 2/1966 | Bresnoff et al. | 244/77 D X |
| 3,516,331 | 6/1970 | Oelrich et al. | 244/78 |

Primary Examiner—George E. A. Halvosa
Assistant Examiner—Galen L. Barefoot
Attorney, Agent, or Firm—William J. Daniel

[57] ABSTRACT

A device for wing droops assembled on the leading edge of an aircraft wing and capable of occupying either a retracted position for flight in the clean configuration or an extended position, projecting before and below the wing, for producing extra lift, comprising a hydraulic valve controlling the supply of hydraulic fluid to jacks which operate the droops, the valve being fitted with a pilot-operated manual control and an automatic control adapted to be actuated by an angle of attack detector of the aircraft.

6 Claims, 5 Drawing Figures

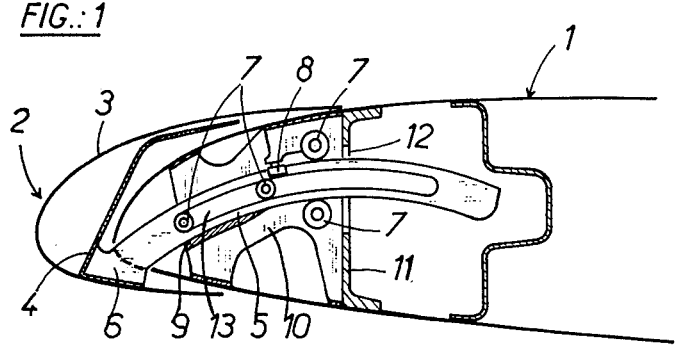
FIG.:1
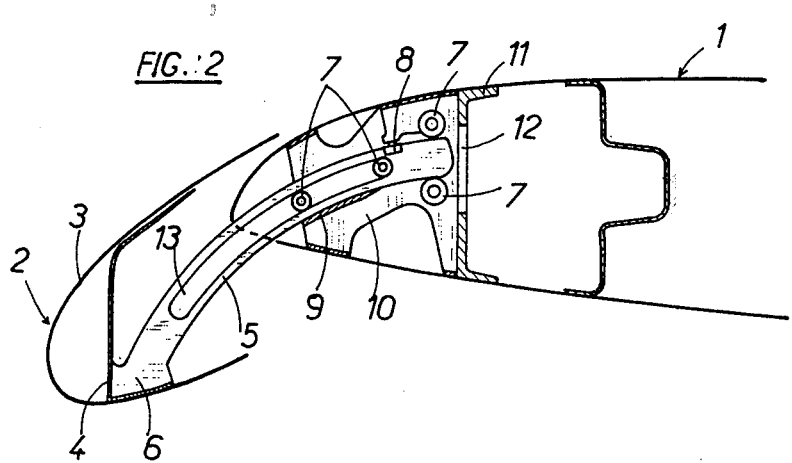
FIG.:2

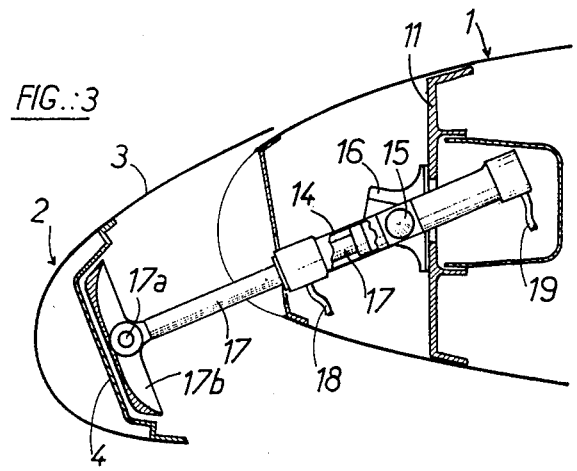
FIG.:3
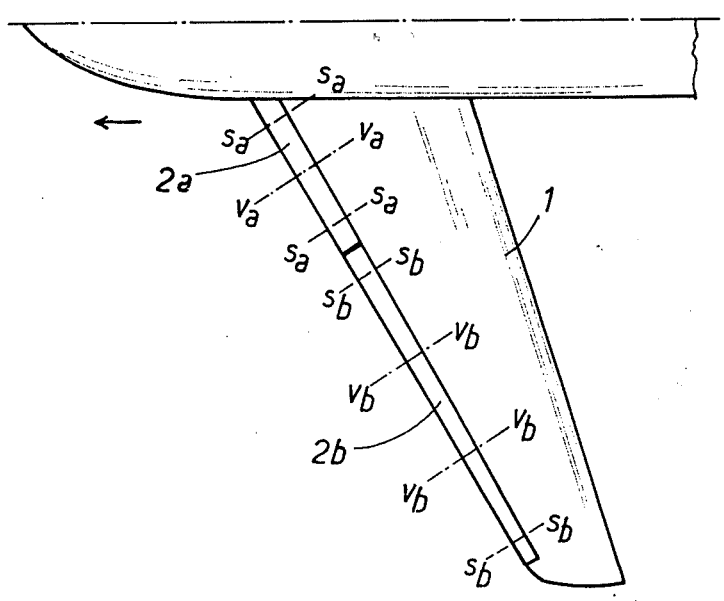
FIG.:4

FLAP OR WING DROOP ARRANGEMENT FOR AN AIRCRAFT WING

BACKGROUND OF THE INVENTION

This invention relates to a flap or wing droop arrangement for fitting to the leading edge of an aircraft wing.

Certain types of modern aircraft wings designed for high cruising speeds do not enable acceptable stall characteristics to be achieved in the clean configuration.

It is necessary to equip these wings with leading edge flaps or wing droops which, in cruising flight, are retracted into the wing profile and are extended and deployed in situations where there is a risk of stalling, in order to increase the lift of the aerofoil.

SUMMARY OF THE INVENTION

The object of the present invention is a device for actuating such leading edge droops, which makes it possible for them to be operated either by the pilot or automatically as a function of the angle of attack.

According to the present invention there is provided a device for wing droops assembled on the leading edge of an aircraft wing and capable of occupying either a retracted position for flight in the clean configuration or an extended position, projecting before and below the wing, for producing extra lift, comprising a hydraulic valve controlling the supply of hydraulic fluid to jacks which operate the droops, the valve being fitted with a pilot-operated manual control and an automatic control adapted to be actuated by an angle of attack detector of the aircraft.

BRIEF DESCRIPTION OF THE DRAWINGS

The invention will now be further described, by way of example, with reference to the accompanying drawings in which:

FIGS. 1 and 2 are sectional views of the leading edge of a wing and respectively show the drop in the retracted and extended positions, the section being taken through one of the planes containing a droop guide element;

FIG. 3 is a similar section but through one of the planes containing a droop control jack;

FIG. 4 is a schematic view in horizontal projection, of a wing equipped with the droop device.

In FIGS. 1 to 4, the leading edge part of an aircraft wing 1 can be seen.

DESCRIPTION OF PREFERRED EMBODIMENTS

Figure 5:
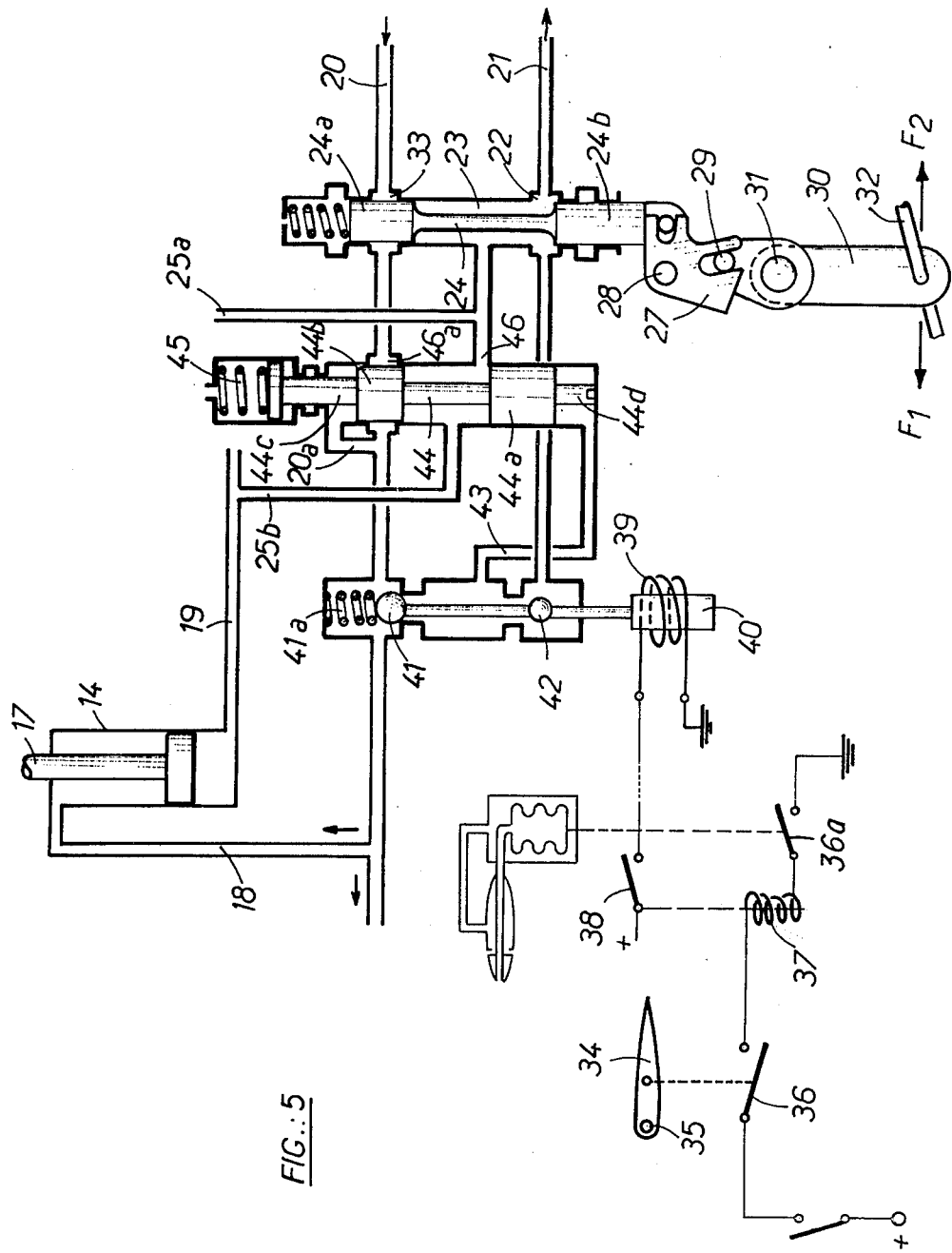
FIG. 5 is a schematic view of an electro-hydraulic device controlling the droops and operable either by the pilot or manually.

In the clean configuration (FIGS. 1 and 4) the leading edge of the wing is embraced by a droop 2 which precisely matches the profile for high cruising speed. This droop is constituted by a profiled fairing 3 attached to a longitudinal stiffening structure 4.

It is connected to the wing through at least two brackets attached to the droop at a certain distance from one another.

Each of these brackets (FIGS. 2 and 3) comprises an arcuate portion 5 terminating at the droop end in a plate 6 attached to the member 4 and guided at its other end in the leading edge section of the wing.

In the embodiment illustrated, guidance is achieved by rollers 7 with horizontal spindles and rollers 8 with their spindles located in a vertical plane, plus, if required, abutment surfaces 9 which can be lined with a material having a low coefficient of friction. These rollers and surfaces are carried by a plate 10 arranged in the wing and attached to a stiffening member 11 thereof, said member containing an opening 12 to pass the bracket 5 when it moves. It will be observed that two of the rollers 7 fit in an arcuate slot 13 in the bracket 5. They thus act as limit stops.

The bracket 5 and the slot 13 preferably have a circular arcuate form so the bracket 5 and the slot travel on each other, making it possible to reduce to a minimum the size of the hole formed in the wing skin. The displacement of the droop is produced by a hydraulic jack.

FIG. 3 illustrates a hydraulic jack whose cylinder 14, housed in the wing, is assembled by two opposite journal stubs 15, forming a horizontal pivot, in a component 16 fixed to the member 11 of the wing. The rod 17 of the jack is articulated at 17a, at its tip, to a pad 17b attached to the droop member. The jack is a double-acting type and its supply can be effected by some suitable device or other, for example through flexible hoses 18, 19 or through passages passing through the journal stubs 15.

Furthermore, the jack is of differential kind, so that at one side the oil pressure acts on the full cross sectional area of its piston, and at the other side on the annular area of the piston defined between the rod and wall of the cylinder (see the cut away view of FIG. 3).

In each of the wings (FIG. 4), the droop is split into two mutually independent sections; 2a (the external droop) which can be separately controlled in a manner which will be explained hereinafter. As for as the internal droop 2a of each wing is concerned, there is provided in two planes perpendicular to the leading edge, such as those $s_a - s_a$ (FIG. 4), a device of the type shown in FIGS. 1 and 2 in order to support the droop 2a and guide it in motion, whilst in an intermediate plane $v_a - v_a$, there is an actuator jack device of the kind shown in FIG. 3.

Similarly, in the case of the external droop 2b of each wing, at $s_b - s_b$ there is a supporting device of the type shown in FIGS. 1 and 2 and in two planes such as those $v_b - v_b$, a jack device in accordance with FIG. 3.

The assembly of internal and external droops on the wings, can be controlled manually by the pilot, for example during take off, approach and landing, at the same time as the trailing edge flaps, of conventional design, which have not been shown here.

Moreover, automatic control is provided in order to extend the droops in the event that too high an angle of attack should give rise to the risk of a stall.

In the preferred device which will be described hereinafter, this automatic control applies only to the external droops 2b which are more effective in controlling stalling. The assembly of the control device has been shown schematically in FIG. 5.

A line 20 is permanently connected to the source of high pressure oil, not shown, but located to the right of the Figure. This line communicates permanently with the lines 18 of all the droop jacks so that the small areas of the pistons in these jacks are permanently subjected to the oil pressure.

Another line 21 or zero pressure return line, connected to the reservoir, normally communicates through the undercut 22 and the annular space 23 around the smaller diameter portion of a spool 24, with two lines 25a and 25b. The line 25a is connected to the lines 19 which communicate with the large-area sides of the pistons belonging to the jacks of the internal droops 2a, whilst the line 25b is similarly connected to the lines 19 supplying the jacks of the external droops 2b.

The result of this arrangement is that in the rest position of the elements, as shown in FIG. 5, there is no pressure on the large-area sides of the jack pistons so that the external and internal droops are retracted and in the positions shown in FIGS. 1 and 4.

The spool 24, comprising a top piston or land 24a and a bottom piston or land 24b, connected by a rod or smaller diameter portion, can be operated by a cranked lever 27 pivoted at 28 and itself controlled by a finger 29 through a lever 30 pivoted at 31. The lever 30 is connected at 32 to a manual control which has not been shown but which is operated by the pilot.

If the pilot pivots the lever 30 in the direction of the arrow $F_1$, the spool 24, displacing upwards, shuts off the undercut 22 with its bottom gland 24b and thus cuts off communication between the line 21 and the lines 25a and 25b, at the same time that its top gland 24a uncovers the undercut 33 of the line 20 and places this line in communication with the lines 25a and 25b whilst maintaining communication between the line 20 and the lines 18. The oil pressure then acts upon the two faces of each of the pistons of the jacks. However, the pressure exerts a greater force on the larger area faces of these pistons so that all the droops are extended.

Conversely, displacement of the lever 30 in the direction $F_2$ re-establishes the state of communication shown in FIG. 5 so that in the jacks only the small-area faces of the pistons are subjected to pressure and the droops are therefore retracted.

For automatic control of the external droops, an angle of attack detector 34 assembled in the nose of the aircraft and comprising, for example, a vane which can rotate about a horizontal axis 35, is connected to a contact breaker 36 so that the latter only closes beyond a certain angle of attack, for example 19°. Its closure results in the energising of a relay 37 which closes its contact 38 and this supplies a relay 39 assembled on the valve, and whose armature 40 is thus displaced upwards.

In performing this movement, the armature 40 opens a valve 41 tapped into the line 20 and closes a valve 42 communicating with the return line 21. The high pressure oil in the line 20 then flows through the line 43 to a chamber beneath the bottom gland 44a of a spool 44. This spool, displaced upwards against the force of a spring 45, closes off an opening 46, with its gland 44a, said opening communicating with the line 25a connected to the internal droop jacks.

The top land 44b of the spool opens into the undercut 46a arranged in the line 20 and thus enables the high pressure oil to flow through the line 25b to the jacks of the external droops which are consequently extended.

It will be observed that the spool butt 44 has a larger cross section at its top end 44c. This makes it possible to use the smaller, top annular area of the land 44b, to exert a restoring force on the spool 44 thanks to permanent communication via 20a with the line 20, whilst not interfering with the motion of the spool upwards when the oil pressure acts upon the bottom land 44a which is of larger annular area. The extension 44d of the spool is used to stop the latter in the correct position.

A reverse effect is produced when, the angle of attack having reduced, the vane 34 breaks the contact 36. The relay 39 de-energises, the spring 41a closes the valve 41 and opens the valve 42 and consequently the spool 44 return to its initial position. The chambers containing the large-area faces of the jack pistons, are exhausted and the droops retract.

It will be observed that the circuit of the relay 37 is closed through a contact breaker 36a. This contact breaker is associated with conventional detection equipment sensitive to the speed of the aircraft (shown schematically in FIG. 5), so that it opens beyond a certain speed (for example 25o knots) and so that the automatic extension of the droops by the angle of attack detector 34 does not come into operation until the aircraft speed has reduced sufficiently to warrant it.

It goes without saying that the embodiment described is purely an example and is open to modification, in particular by the substitution of equivalent techniques, without in so doing departing from the scope of the invention

What is claimed is:

1. In a device for controlling wing droops assembled on the leading edge of an aircraft wing and capable of occupying either a retracted position for flight in the clean configuration or an extended position projecting before and below the wing for producing extra lift, comprising a plurality of jacks for operating the droops, a hydraulic valve means adapted to regulate the supply of hydraulic fluid to said jacks, and control means for said valve means, the improvement wherein said control means comprises a pilot-operated manual control and an automatic control adapted to be actuated by an angle of attack detector of the aircraft, and said droop comprises two independent sections along its length, both of said two sections being operated simultaneously by said manual control through the simultaneous supplying of their jacks via said valve means, while only the section in each wing which is nearer the wing tip has the jacks therefor operatively connected to valve means by said automatic control.

2. A device as claimed in claim 1, in which said valve comprises a first manually operated spool valve, a distributing system associated with said first spool valve which communicates with all the jacks of the droops, and a second automatically operated spool valve, and a distribution system associated with said second spool valve which communicates solely with the jacks associated with the droop section located nearest the wing tips.

3. A device as claimed in claim 1, comprising an electromagnetic relay provided with an angle of attack detector for controlling the same, a speed detector associated with a contact breaker, and circuit means for connecting the relay and the contact breaker so that automatic control of said droop takes place only below a certain aircraft speed.

4. A device for controlling wing droops assembled on the leading edge of an aircraft wing and capable of occupying either a retracted position for flight in the clean configuration or an extended position projecting before and below the wing for producing extra lift, said wing comprising a wing tip section and a central section, each having a droop associated therewith, said device comprising a source of hydraulic pressure, a hydraulic circuit connecting said source through two distributing members with a plurality of jacks that operate the droops, a pilot-operated manual control for actuating a first one of said distributing members, and an automatic control adapted to be actuated by an angle of attack detector of the aircraft for actuating the second one of said distributing members, said hydraulic circuit being so arranged that the second distributing member controls only the jacks that actuate the droops of the wing tip section.

5. A device for controlling wing droops assembled on the leading edge of an aircraft wing and capable of occupying either a retracted position for flight in the clean configuration or an extended position, projecting before and below the wing, for producing extra lift, said wing comprising a wing tip section and a central section, each having a droop associated therewith, said device comprising two spool valves, a solenoid valve, a source of hydraulic pressure, and a hydraulic circuit connecting said source through said spool valves to a plurality of jacks that operate the droops, a pilot-operated manual control for actuating a first one of the spool valves, electrical circuit means including a device sensitive to the angle of attack of the aircraft and operative for actuating said solenoid valve, hydraulic means for controlling the second one of the spool valves by said solenoid valve, the connections of said hydraulic circuit being so arranged that the second spool valve controls the actuation of the droop of the wing tip section when the angle of attack device is operative.

6. A device according to claim 5, wherein said electrical circuit menas include two circuits, a first circuit including an angle of attack detector, a contact breaker and means for controlling the second circuit, said second circuit including the solenoid of said solenoid valve, said contact breaker being under control of a speed detector so that automatic control of said droops can only take place below a certain aircraft speed.

* * * * *